(12) United States Patent
Bager et al.

(10) Patent No.: US 8,704,392 B2
(45) Date of Patent: Apr. 22, 2014

(54) METHOD AND SYSTEM FOR CONTROLLING AN ELECTRIC DEVICE OF A WIND TURBINE

(75) Inventors: Troels Bager, Viborg (DK); Kaj Skov Nielsen, Issaquah, WA (US)

(73) Assignee: Siemens Aktiengesellschaft, Munich (DE)

( * ) Notice: Subject to any disclaimer, the term of this patent is extended or adjusted under 35 U.S.C. 154(b) by 154 days.

(21) Appl. No.: 13/292,637

(22) Filed: Nov. 9, 2011

(65) Prior Publication Data

US 2012/0133133 A1 May 31, 2012

(30) Foreign Application Priority Data

Nov. 26, 2010 (EP) .................................... 10192749

(51) Int. Cl.
*F03D 9/00* (2006.01)
(52) U.S. Cl.
USPC .......................................................... 290/44
(58) Field of Classification Search
USPC .................................................... 290/44, 55
See application file for complete search history.

(56) References Cited

U.S. PATENT DOCUMENTS

| 2007/0120369 | A1 | 5/2007 | Delmerico |
| 2009/0206606 | A1 | 8/2009 | Helle |
| 2011/0031748 | A1* | 2/2011 | Arinaga et al. ................. 290/44 |
| 2011/0077787 | A1* | 3/2011 | Yasugi .......................... 700/287 |
| 2011/0137474 | A1* | 6/2011 | Larsen et al. ................. 700/287 |

FOREIGN PATENT DOCUMENTS

| EP | 2 072 813 A2 | 6/2009 |
| EP | 2 161 443 A2 | 3/2010 |
| EP | 2 166 225 A1 | 3/2010 |
| WO | WO 2005046044 A1 | 5/2005 |
| WO | WO 2009/082204 A1 | 7/2009 |
| WO | WO 2010000723 A2 | 1/2010 |

* cited by examiner

*Primary Examiner* — Truc Nguyen

(57) ABSTRACT

A method for controlling an electric device of a wind turbine is disclosed. The method includes: receiving a state signal of a utility grid electrically connected to the electric device; and controlling an operation of the electric device based on the state signal. Further, a system for controlling an electric device of a wind turbine and a wind turbine are provided.

15 Claims, 1 Drawing Sheet

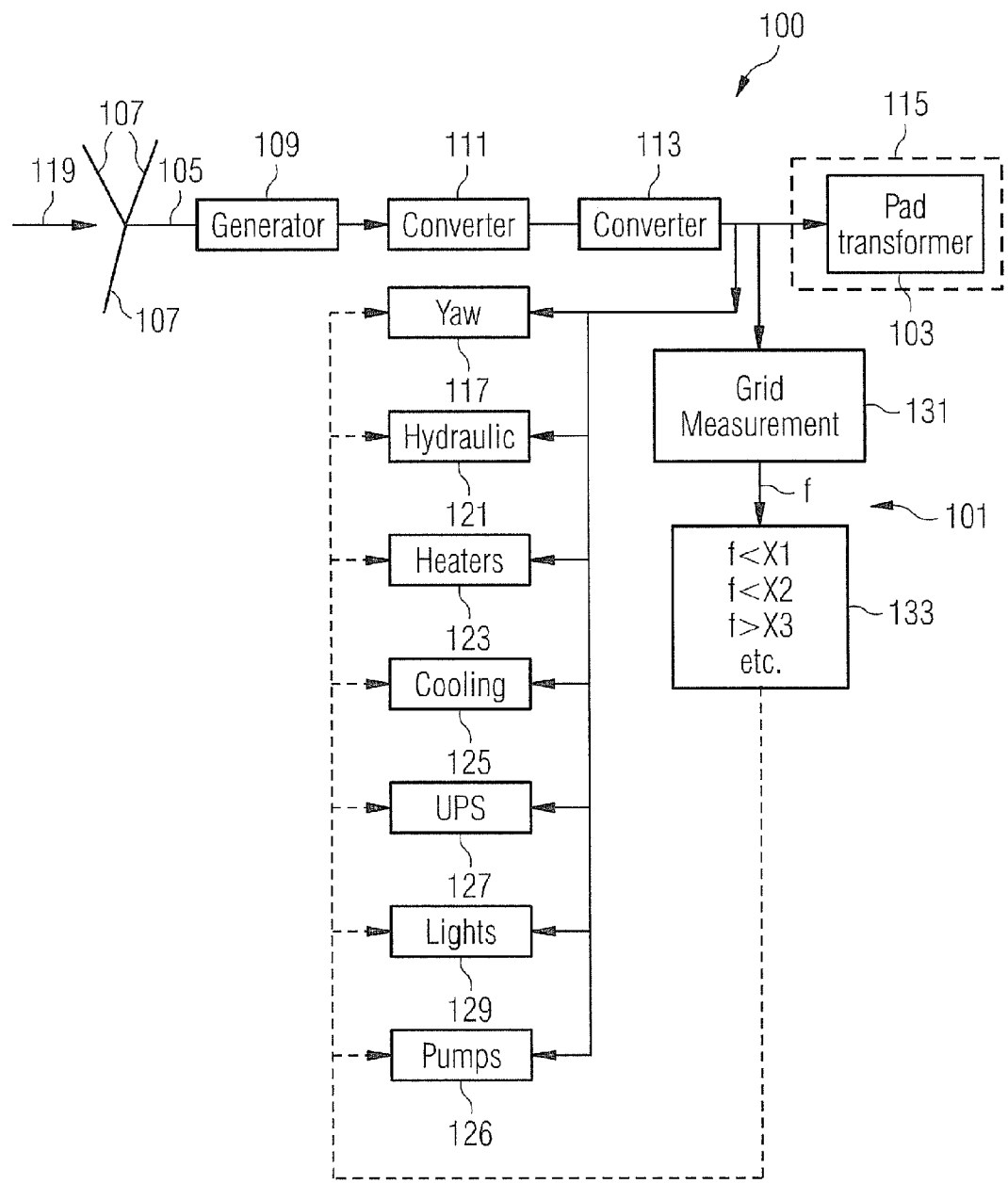

METHOD AND SYSTEM FOR CONTROLLING AN ELECTRIC DEVICE OF A WIND TURBINE

CROSS REFERENCE TO RELATED APPLICATIONS

This application claims priority of European Patent Office application No. 10192749.9 EP filed Nov. 26, 2010, which is incorporated by reference herein in its entirety.

FIELD OF INVENTION

The present invention relates to a method and to a system for controlling an electric device of a wind turbine and to a wind turbine comprising the system for controlling the electric device. In particular, the present invention relates to a method and to a system for controlling an electric device of a wind turbine, wherein the electric device consumes energy from an utility grid or transfers energy to the utility grid or consumes power from the wind power plant.

ART BACKGROUND

In a conventional power production facility a high number of wind turbines may transfer electric energy into an utility grid. Commercial and/or private consumers may consume energy taken from the utility grid. Thereby, the energy demand or power demand of the consumers may vary with time.

In particular, during large changes in the energy demand of the consumers, the energy demand or power demand of the consumers may not match the energy transferred from the power producers (in particular one or more wind turbines) to the utility grid. In this situation, in a conventional wind turbine, the power output or energy output of the wind turbine, in particular the power output of a converter of the wind turbine, may be increased for a short period of time, in order to improve the balance the amount of energy transferred from the wind turbine to the utility grid and the energy demand of the consumers taken from the utility grid. In particular, the frequency of the grid may drop, when the energy demand of the consumers is greater than the energy transferred from the power producers (in particular one or more wind turbines) to the utility grid. In contrast, the frequency of the utility grid may increase, if the energy transferred from the power producers (in particular one or more wind turbines) to the utility grid is greater than the energy consumed by the consumers.

When the output of the converter of the wind turbine is increased for a short period of time to recover the frequency of the utility grid (such as 50 Hz for Europe or 60 Hz for the United States) more kinetic energy is pulled from the rotor of the wind turbine resulting in a slowdown of the rotational speed of the rotor. Thereby, an efficiency of the wind turbine may be reduced. Thus, the increase of the output of the converter of the wind turbine may be followed by a recovery time, where a lower production can be exported.

US 2007/0120369 discloses a system and a method for utility and wind turbine control, wherein the wind turbine system includes a controller comprising an internal reference frame of the wind turbine generator coupled to the converter and configured for modulating flow of power through the converter in response to frequency disturbances or power swings of the utility system relative to the internal reference frame. In order to boost the output temporarily during a low frequency event, the converter of the wind turbine would have to be overloaded temporarily. This may not only increase the load of the converter but may also increase the load on the turbine drive train. Thereby, disadvantages may be encountered.

There may be a need for a method and for a system for controlling an electric device of a wind turbine, wherein a stability of the utility grid may be maintained or at least improved. In particular, there may be a need for a method and a system for controlling an electric device of a wind turbine, which do not require to overload a converter of the wind turbine during a power swing, thus avoiding corresponding disadvantages.

SUMMARY OF THE INVENTION

This need may be met by the subject matter according to the independent claims. Advantageous embodiments of the present invention are described by the dependent claims.

According to an embodiment a method for controlling an electric device (comprised in the wind turbine, in particular being internal to the wind turbine or at least adjacent to the wind turbine) of a wind turbine is provided, wherein the method comprises receiving (which may comprise supplying, accessing, acquiring, measuring, determining, and/or deriving) a state signal (any signal indicative of a state of the utility grid, in particular a signal indicative of an electric state of the utility grid, such as regarding voltage, current, and/or frequency) of a utility grid (provided for supplying electric energy to commercial and/or private consumers) electrically connected (in particular enabling or facilitating power flow in two opposite directions) to the electric device; and controlling (such as for example shutting down, shutting off, activating, and/or adjusting) an operation of the electric device based on the state signal. In particular, the controlling the operation of the electric device may depend on the state signal. In particular, according to an embodiment, the wind turbine may be idle and may not supply electric energy to the utility grid, while the operation of the electric device is controlled.

In particular, during controlling the operation of the electric device overloading the converter of the wind turbine may be avoided, thus avoiding impairing the operation of the wind turbine. Thus, inertia response is provided in a simple manner. In particular, the converter of the wind turbine may be designed to manage the rated power of the wind turbine plus the internal consumption, to ensure that the measured resulting power output reaches the level of the sales power curve. Instead of overloading the converter during transient situations at least one (in particular all) unessential internal consumption of electric devices of the wind turbine may be removed for a short period of time. Thereby, the need to overload the converter could be reduced with limited impact on the turbine operation and with no significant impact on the life expectancy of the wind turbine. The total effect of this control method may be slightly statistical as any given turbine may have a limited ability to support the function, but statistically the feature may have a positive impact on the grid stability (in particular regarding the frequency of the utility grid), when a large number of wind turbines (such as greater than 1000) are provided with the controlling function.

In particular, the state signal may depend on a ratio of energy or power supplied to the utility grid and energy or power drawn from the utility grid. Thus, the state signal may depend on a ratio of production and consumption of energy or power. By controlling the operation of the electric device (or two or more electric devices comprised in the wind turbine) the stability of the utility grid (in particular regarding the frequency of the utility grid) may be improved. At the same time, components, such as the converter, of the wind turbine may not be overloaded.

According to an embodiment the controlling the operation of the electric device comprises controlling a power consumption of the electric device (this is the power consumed by the electric device during operation) from the utility grid or a power transfer of the electric device to the utility grid (this may be the power or energy supplied from the electric device, such as a battery or an accumulator, supplied to the utility grid). In particular, if the state signal indicates that the energy or power supplied from the wind turbine or wind turbines to the utility grid is smaller than the energy or power transferred from the utility grid to the commercial or private consumers, the power consumption of the electric device may be reduced and/or the power transfer of the electric device to the utility grid may be increased. Thereby, the stability of the utility grid may be improved.

According to an embodiment the method for controlling an electric device further comprises supplying the utility grid with electric power from a generator mechanically connected to a rotor of the wind turbine. Thus, the wind turbine transfers electric energy to the utility grid which in turn is connected to the electric device. In particular, the electric device may not internally be electrically connected to the generator of the wind turbine, but exclusively to the utility grid. Thereby, the electric energy may also be operated, when the wind turbine is idling (producing no electric energy). Thus, operation of the wind turbine may not depend on whether the wind turbine produces energy or does not produce energy.

According to an embodiment the method for controlling an electric device further comprises converting the electric power from the generator to a power signal having a predetermined frequency (such as for example 50 Hz or 60 Hz). In particular, the converting the electric power may be performed using a full converter enabling control of energy drawn from the rotor of the wind turbine. Thereby, supply of energy or power generated by the wind turbine to the utility grid may be facilitated. In particular, the increase in output may contribute to restoring the grid balance and thus may restore the grid frequency to nominal. In particular, predetermined frequency may be adjusted to match the (nominal) frequency of the utility grid.

According to an embodiment an amount of the electric power supplied from the generator to the utility grid is maintained (at least approximately) constant upon a change of the state signal of the utility grid. In particular, this function may be applied by itself or applied in conjunction with another type of power boost reducing the rotor RPM. But with the combination the potential load on the converter may still be reduced and the recovery time may be reduced compared to a system solely using a converter regulation. Thereby, overloading the generator and/or the converter of the wind turbine may be avoided, to improve the efficiency and/or the life expectancy of the wind turbine.

According to an embodiment the method for controlling an electric device further comprises supplying the utility grid with electric power from an energy buffer (such as a battery or an accumulator, in particular an uninterruptable power supply system) of the wind turbine based on the state signal. In particular, when the frequency of the utility grid drops below a threshold (indicating that the energy demand of the consumers is greater than the energy production of the wind turbine or wind turbines) additional energy or power may be supplied from the energy buffer to the utility grid, to at least approximately restore the desired frequency of the utility grid.

According to an embodiment the method for controlling an electric device further comprises determining (in particular comprising measuring, computing, deriving, accessing, receiving, and/or transforming) the state signal of the utility grid. In particular, a measurement system, a (e.g. incorporated in the existing turbine controller) computing system and/or a transformation system may be utilized for the determining the state signal. In particular, the determining the state signal may be performed within the wind turbine or within a controller of the wind turbine.

According to an embodiment the state signal comprises a frequency (a frequency of an AC power signal) of the utility grid. In particular, a frequency change of the utility grid may indicate that there is an unbalance of power production and power consumption. This unbalance of power production and power consumption is undesired and may be reduced according to an embodiment. Further, a change of the frequency of the utility grid is undesired, since many consumer devices require an AC power signal having a predetermined frequency.

Thereby, a deviation of the utility grid from an optimal electric condition may be easily determined by measuring the frequency of the utility grid.

According to an embodiment the controlling the operation of the electric device comprises comparing the frequency of the utility grid with a reference value, such as 50 Hz or 60 Hz.

According to an embodiment the power consumption of the electric device from the utility grid is reduced, if the frequency of the utility grid is smaller than the reference value. According to another embodiment the power transfer of the electric device to the utility grid is increased, if the frequency of the utility grid is smaller than the reference value. Thereby, the predetermined frequency of the utility grid may at least approximately (directly or indirectly) be restored.

According to an embodiment the power consumption of the electric device from the utility grid is shut off, if the frequency of the utility grid is smaller than the reference value by at least a predetermined threshold. The predetermined threshold may amount to for example 0.1 Hz, 0.5 Hz, 0.05 Hz, 0.01 Hz, or other values. According to alternative embodiments the power consumption of the electric device may be gradually reduced, if the frequency of the utility grid is smaller than the reference value and the gradual reduction of the energy consumption may be increased the larger the deviation of the frequency of the utility grid from the reference value is. Thereby, the stability of the utility grid (in particular regarding its frequency) may be improved.

According to an embodiment a system for controlling an electric device of a wind turbine is provided, wherein the system comprises the electric device (in particular an internal electric device comprised within or adjacent to the wind turbine, the electric device being a device configured for serving a function of the wind turbine) electrically connectable to an utility grid; and a controller adapted for receiving a state signal of the utility grid and also adapted for controlling an operation of the electric device based on the received state signal. In particular, the system for controlling an electric device of a wind turbine may not be connected to a central control system for controlling a large number of wind turbines, but may be independent of a central control system. Thereby, each wind turbine of a power production plant or wind farm may be equipped with a system for controlling (at least one, in particular all) electric device(s) of the corresponding wind turbine.

According to an embodiment the system for controlling an electric device further comprises a measurement system for measuring the state signal. Further, the system for controlling an electric device may comprise a computing system, a storage system, an arithmetic/logic system for deriving, computing and/or measuring the state signal. Further, the system may comprise one or more sensors and/or detection devices for measuring the state signal.

According to an embodiment the electric device comprises at least one of the yaw motors for orienting the wind turbine relative to the wind direction, hydraulics for moving a component of the wind turbine, a heater for heating a component of the wind turbine, a cooling device for cooling a component of the wind turbine, the pumps circulating cooling liquids, an uninterruptible power supply system, and a light source. Some of these types of devices may temporarily be reduced in power consumption without impairing the operation of the wind turbine.

According to an embodiment a wind turbine comprising a system for controlling an electric device of the wind turbine is provided.

It should be understood that features (individually or in an combination) disclosed, described, explained or mentioned with respect to a method for controlling an electric device of a wind turbine may also be applied to a system for controlling an electric device of a wind turbine and to a wind turbine comprising the system for controlling the electric device.

According to an embodiment a wind turbine system comprises a wind turbine operable to supply wind power to an utility system; a grid measurement device arranged for detecting frequency changes in the utility system; and a controller for increasing or decreasing the power consumption of at least one electrical component inside the wind turbine according to the frequency changes detected by the grid measurement device. In particular, if the frequency falls below a certain threshold, power consumption from an electrical component inside the wind turbine may be decreased, or switched off. Further in particular, if the frequency raises above a certain threshold, power consumption from an electrical component inside the wind turbine may be increased or switched on.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

Embodiments of the present invention are now described with reference to the accompanying drawing. The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

The FIGURE schematically illustrates a portion of a wind turbine according to an embodiment.

DETAILED DESCRIPTION

The FIGURE schematically illustrates a wind turbine 100 according to an embodiment and a pad transformer connected to the utility grid. The wind turbine 100 comprises a rotor comprising a rotor shaft 105 to which plural rotor blades 107 are connected. The rotor shaft is mechanically connected to a generator 109 which generates electric energy upon rotation of the rotor shaft 105. The electric energy generated by the generator 109 is supplied to a variable frequency AC-DC converter 111 which converts the variable frequency AC power signal to a DC power signal. The DC power signal is supplied, to a frequency DC-AC converter 113 which converts the DC power signal to a frequency AC signal having a predetermined nominal frequency, such as 50 Hz or 60 Hz. The AC power signal is supplied to the utility grid 115. The utility grid or alternatively the wind turbine 100 comprises a pad trans-former 103 for transforming the AC power signal output from the converter 113 to an AC power signal having a predetermined voltage (or predetermined maximal or minimal voltage).

The wind turbine 100 further comprises a system 101 for controlling an electric device of the wind turbine 100. The system 101 comprises several electric devices of the wind turbine 100, such as a yaw 117 for orienting the wind turbine 100 relative to the wind direction 119; hydraulic components 121 for moving one or more components of the wind turbine 100; a heater 123 for heating a component of the wind turbine 100; a cooling device 125 for cooling a component of the wind turbine 100; an uninterruptible power supply system (UPS) 127 for providing electric energy in case no electric energy can be drawn from the utility system 115; and a light source 129 for illuminating the inside of the wind turbine 100 or for illuminating the outside of the wind turbine 100 or for illuminating other components of the wind turbine 100.

Further, the system 101 for controlling an electric device of the wind turbine 100 comprises a grid measurement system 131 which is adapted to measure a frequency of the utility grid 115. Further, the system 101 comprises a controller 133 which receives the frequency f of the utility grid measured by the grid measurement system 131. The controller 133 compares the measured frequency f of the grid with at least one reference value (such as 50 Hz or 60 Hz) and determines a deviation of the grid frequency from the reference value. In particular, the frequency measured by the grid measurement system 131 represents a state signal of the utility grid indicative of an electrical property or electrical condition of the utility grid 115. Based on the state signal measured or determined by the grid measurement system 131 the controller 133 controls the operation of at least one electrical device 117, 121, 123, 125, 127, and/or 129 of the wind turbine 100.

In particular, if the frequency of the utility grid 115 is below the reference frequency or reference value the controller 133 may shut down one or more of the electric devices 117, 121, 123, 125, 127, and/or 129 or may at least reduce their energy consumption. Thereby, the frequency of the utility grid may at least approximately be restored to be the reference frequency. Further, in this case, the uninterruptible power system 127 may deliver electrical power to the utility grid 115.

If in contrast, the grid measurement system measures the grid frequency to be above the reference frequency, the controller 133 may turn on the operation of at least one of the electric devices 117, 121, 123, 125, 127, and/or 129 or may at least increase their energy consumption, in order to reduce the grid frequency and to at least approximately restore the reference frequency.

The yaw 117 may be critical during high wind conditions such that the turbine is pointing into the proper wind direction. However, during low wind conditions orientation of the wind turbine may be much less critical (thus not requiring the yaw) and the impact on the power output from a turbine may not be significantly impacted by postponing activation of the yaw for a few seconds, if the frequency of the utility grid 115 is at a low level. Limits and specific conditions of postponing the activation of the yaw may be dependent on the particular application and required performance.

The hydraulic components 121 may be required for all kinds of movements of components of the wind turbine, such as the break system, the yaw, the pitch angle and others. However, some of these movements may not be required under certain conditions, such that these hydraulic components may be switched off or which may be at least reduced in energy consumption.

The heaters 123 may be adapted for heating one or more bearings, the oil in the bearings, electronic components, such as panels and may also be adapted for heating the generator. For most situations or running conditions of the wind turbine there may be no significant impact from disabling most heaters for short time durations. Heaters in the gearboxes, controllers and generators may represent some consumption, but turbines with cold weather packages could contribute in a significant way. Thereby, disabling the heaters or at least some of the heaters may be possible during short durations.

The cooling devices 125 may be provided to cool the converters 111, 113, to cool the hydraulic oil, to cool panels, and to cool other electric or electronic components. For most situations, there may be no significant impact from disabling most cooling for short durations.

The uninterruptible power system 127, when fully charged, could actively contribute to grid stability by not being charged during low frequency events. Instead of being a consuming component it may be used in such situations to support the operation of the controls allowing the turbine to temporarily export slightly more power.

One or more light sources may be powered by batteries and/or the utility grid. There may be significant worker safety issues in possibly dimming the lights temporarily, even if there is battery backup on lights in all parts of the turbine, so any steps here would have to be considered very carefully. But similarly as to the UPS, these battery systems could contribute to the grid stability in a small way. The amount of the individual battery may seem insignificant, but the combined effect of these batteries, when turbines reach a high penetration, could still provide a small amount of grid support.

One or more pumps (126) circulate cooling liquids to aid in cooling several components of the wind turbine.

The turbine 100 is adapted for performing a method for controlling an electric device of the wind turbine 100, as explained above.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method for controlling an electric device of a wind turbine, the method comprising:
receiving a state signal of a utility grid, the electric device being directly electrically connected to the utility grid; and
controlling an operation of the electric device based on the state signal,
wherein controlling the operation of the electric device comprises controlling a power consumption of the electric device from the utility grid.

2. The method according to claim 1,
wherein controlling the operation of the electric device comprises controlling a power transfer of the electric device to the utility grid.

3. The method according to claim 1, further comprising:
supplying the utility grid with electric power from a generator mechanically connected to a rotor of the wind turbine.

4. The method according to claim 3, further comprising:
converting the electric power from the generator to a power signal having a nominal frequency.

5. The method according to claim 3,
wherein an amount of the electric power supplied from the generator to the utility grid is maintained constant upon a change of the state signal of the utility grid.

6. The method according to claim 1, further comprising:
supplying the utility grid with electric power from an energy buffer of the wind turbine based on the state signal.

7. The method according to claim 1, further comprising:
determining the state signal of the utility grid.

8. The method according to claim 1,
wherein the state signal comprises a frequency of the utility grid.

9. The method according to claim 8,
wherein the controlling the operation of the electric device comprises comparing the frequency of the utility grid with a reference value.

10. The method according to claim 9,
wherein the power consumption of the electric device from the utility grid is reduced, if the frequency of the utility grid is smaller than the reference value.

11. The method according to claim 9,
wherein the power consumption of the electric device from the utility grid is shut off, if the frequency of the utility grid is smaller than the reference value by at least a predetermined threshold.

12. A system for controlling an electric device of a wind turbine, the system comprising:
the electric device directly electrically connected to an utility grid; and
a controller configured to receive a state signal of the utility grid and to control an operation of the electric device based on the state signal,
wherein the controller is configured for controlling the operation of the electric device by controlling a power consumption of the electric device from the utility grid.

13. The system according to claim 12, further comprising:
a measurement system for measuring the state signal.

14. The system according to claim 12,
wherein the electric device comprises at least one yaw motor for orienting the wind turbine relative to the wind direction, hydraulics for moving a component of the wind turbine, a heater for heating a component of the wind turbine, a cooling device for cooling a component of the wind turbine, an uninterruptible power supply system, a light source, and a pump for circulating cooling liquids.

15. A wind turbine comprising a system according to claim 12.

* * * * *